United States Patent
Pan et al.

(10) Patent No.: US 11,461,085 B2
(45) Date of Patent: Oct. 4, 2022

(54) FIRMWARE UPGRADE METHOD IN MULTIPLE NODE STORAGE SYSTEM

(71) Applicant: QUANTA COMPUTER INC., Taoyuan (TW)

(72) Inventors: Kai-Yeh Pan, Taoyuan (TW); Chun-Ching Yu, Taoyuan (TW); Shuen-Hung Wang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 448 days.

(21) Appl. No.: 16/294,566

(22) Filed: Mar. 6, 2019

(65) Prior Publication Data

US 2020/0285455 A1 Sep. 10, 2020

(51) Int. Cl.
*G06F 8/65* (2018.01)
*G06F 3/06* (2006.01)

(52) U.S. Cl.
CPC .............. *G06F 8/65* (2013.01); *G06F 3/0614* (2013.01); *G06F 3/0646* (2013.01); *G06F 3/0685* (2013.01)

(58) Field of Classification Search
CPC ........ G06F 8/65; G06F 3/0614; G06F 3/0646; G06F 3/0685; G06F 3/0604; G06F 3/061; G06F 3/0629; G06F 3/0688; G06F 12/02; G06F 12/0246; G06F 12/0802; G06F 12/0866; G06F 13/16; G06F 13/1673; G06F 2212/2024; G06F 2212/205; G06F 2212/60
USPC ........................................................ 717/168
See application file for complete search history.

(56) References Cited

U.S. PATENT DOCUMENTS

| | | | |
|---|---|---|---|
| 10,120,676 B2 | 11/2018 | Su | |
| 2014/0181364 A1* | 6/2014 | Berke et al. | G06F 3/0685 711/103 |
| 2016/0328300 A1* | 11/2016 | Rahardjo et al. | G06F 12/0246 |
| 2017/0139592 A1* | 5/2017 | Qin et al. | G06F 3/061 |
| 2017/0168744 A1* | 6/2017 | Nguyen et al. | G06F 3/0685 |
| 2019/0079748 A1* | 3/2019 | Chu et al. | G06F 3/0614 |

FOREIGN PATENT DOCUMENTS

| | | |
|---|---|---|
| CN | 102662702 B | 8/2015 |
| CN | 105988844 A | 10/2016 |
| TW | I547873 B | 9/2016 |

OTHER PUBLICATIONS

TW Office Action for Application No. 108115186, dated Sep. 7, 2020, w/ First Office Action Summary.
TW Search Report for Application No. 108115186, dated Sep. 7, 2020, w/ First Office Action.

* cited by examiner

*Primary Examiner* — Wei Y Zhen
*Assistant Examiner* — Mohammed N Huda
(74) *Attorney, Agent, or Firm* — Nixon Peabody LLP

(57) ABSTRACT

A multiple storage node system including a first and second node is provided. The first node includes a first baseboard management controller (BMC), a first flash ROM configured to store a first flash image, and a first switch device configured to connect the first BMC to the first flash ROM. The second node includes an exact configuration of the first node. The first BMC is connected to the second switch device, and the second flash image is the same as the first flash.

20 Claims, 3 Drawing Sheets

FIRMWARE UPGRADE METHOD IN MULTIPLE NODE STORAGE SYSTEM

FIELD OF THE INVENTION

The present disclosure relates to network computing and more specifically, to updating firmware in a multiple-node storage system.

BACKGROUND

When a server or storage system is power cycled, the first action a central processing unit (CPU) takes is to send a message to activate the Basic Input and Output System (BIOS). The BIOS then runs a series of tests, called the POST (Power On Self-Test), to verify if the system devices are working correctly. The BIOS enables the essential functions for the server to operate. If the BIOS is corrupted, the CPU cannot function. However, a typical BIOS can restore a valid BIOS image in the event that it becomes corrupt. This is accomplished by storing a recovery program in a flash memory that is not in-system writable. This ensures the recovery program cannot be corrupted. The recovery program is usually a simple code that has the ability to initialize minimal system hardware to retrieve a new code image from a flash drive or other removable media. This power cycle and restore function also is required for the firmware for other controllers such as baseboard management controllers or memory switch controllers.

SUMMARY

The various examples of the present disclosure are directed towards a multiple storage node system including a first and second node. The first node includes a first baseboard management controller (BMC), a first flash ROM configured to store a first flash image, and a first switch device configured to connect the first BMC to the first flash ROM. The second node includes a second BMC connected to the first switch device, a second flash ROM configured to store a second flash image, and a second switch device configured to connect the second BMC to the second flash ROM. The first BMC is connected to the second switch device. Moreover, the second flash image is the same as the first flash image.

In some embodiments, the first node further includes a first storage controller, a third flash ROM configured to store a third flash image, and a third switch device configured to connect either the first BMC or the second BMC to the third flash ROM. In some embodiments, the second node further includes a second storage controller, a fourth flash ROM configured to store a fourth flash image, fourth flash image identical to the third flash image, and a fourth switch configured to connect either the first BMC or the second BMC to the fourth flash ROM.

The first node can also include a first plurality of storage devices connected to the first storage expander/switch controller and the second storage expander/switch controller. The first plurality of storage devices can include a hard disk drive (HDD), a solid state drive (SSD), and/or a non-volatile memory express (NVMe). In some embodiments, the NVMe is configured to serve as a host controller interface and storage protocol to facilitate transfer of data between the first storage expander/switch controller and the SSD drive.

Similarly, the second node can include a second plurality of storage devices connected to the first storage expander/switch controller and the second storage expander/switch controller. The second plurality of storage devices can include a hard disk drive (HDD), a solid state drive (SSD), and/or a non-volatile memory express (NVMe). The NVMe can be configured to serve as a host controller interface and storage protocol to facilitate transfer of data between the second storage expander/switch controller and the SSD drive.

In some embodiments the first flash image includes a first BMC firmware flash image and the second flash image includes a first storage expander/switch controller firmware flash image. The third flash image includes a second BMC firmware flash image and the fourth flash image includes a second storage expander/switch controller firmware flash image.

The first switch device, the second switch device, the third switch device, and the fourth switch device each include a multiplexor (MUX). The first switch device, the second switch device, the third switch device, and the fourth switch device can be configured to multiplex the first BMC and the second BMC.

In some embodiments the first BMC is configured to retrieve the third flash image stored in the third flash ROM, or the fourth flash image in the fourth flash ROM. Likewise, the second BMC can be configured to retrieve the first flash image stored in the first flash ROM, or the second flash image stored in the second flash ROM.

The various examples of the present disclosure are directed towards a method of updating a firmware in a multi storage node system. The method includes power cycling a first node. The first node includes a first BMC, a first flash ROM configured to store a first flash image, and a first switch device configured to connect the first BMC to the first flash ROM. The method also includes activating the first flash image in the first flash ROM. The method includes determining if a hardware component within the first node is not online or ready for a firmware update, the second flash image is corrupted, and/or the first node is unable to boot. The method also includes retrieving, by the first BMC, a second flash image stored in a second flash ROM stored on a second node. The first BMC is connected to a second switch device in the second node. The second flash image is the same as the first flash.

Additional features and advantages of the disclosure will be set forth in the description that follows, and in part, will be obvious from the description, or can be learned by practice of the principles disclosed herein. The features and advantages of the disclosure can be realized and obtained by means of the instruments and combinations particularly pointed out in the appended claims. These and other features of the disclosure will become fully apparent from the following description and appended claims, or can be learned by the practice of the principles set forth herein.

BRIEF DESCRIPTION OF THE DRAWINGS

In order to describe the manner in which the above-recited disclosure and its advantages and features can be obtained, a more particular description of the principles described above will be rendered by reference to specific examples illustrated in the appended drawings. These drawings depict only example aspects of the disclosure, and are therefore not to be considered as limiting of its scope. These principles are described and explained with additional specificity and detail through the use of the following drawings.

DETAILED DESCRIPTION

Figure 1:
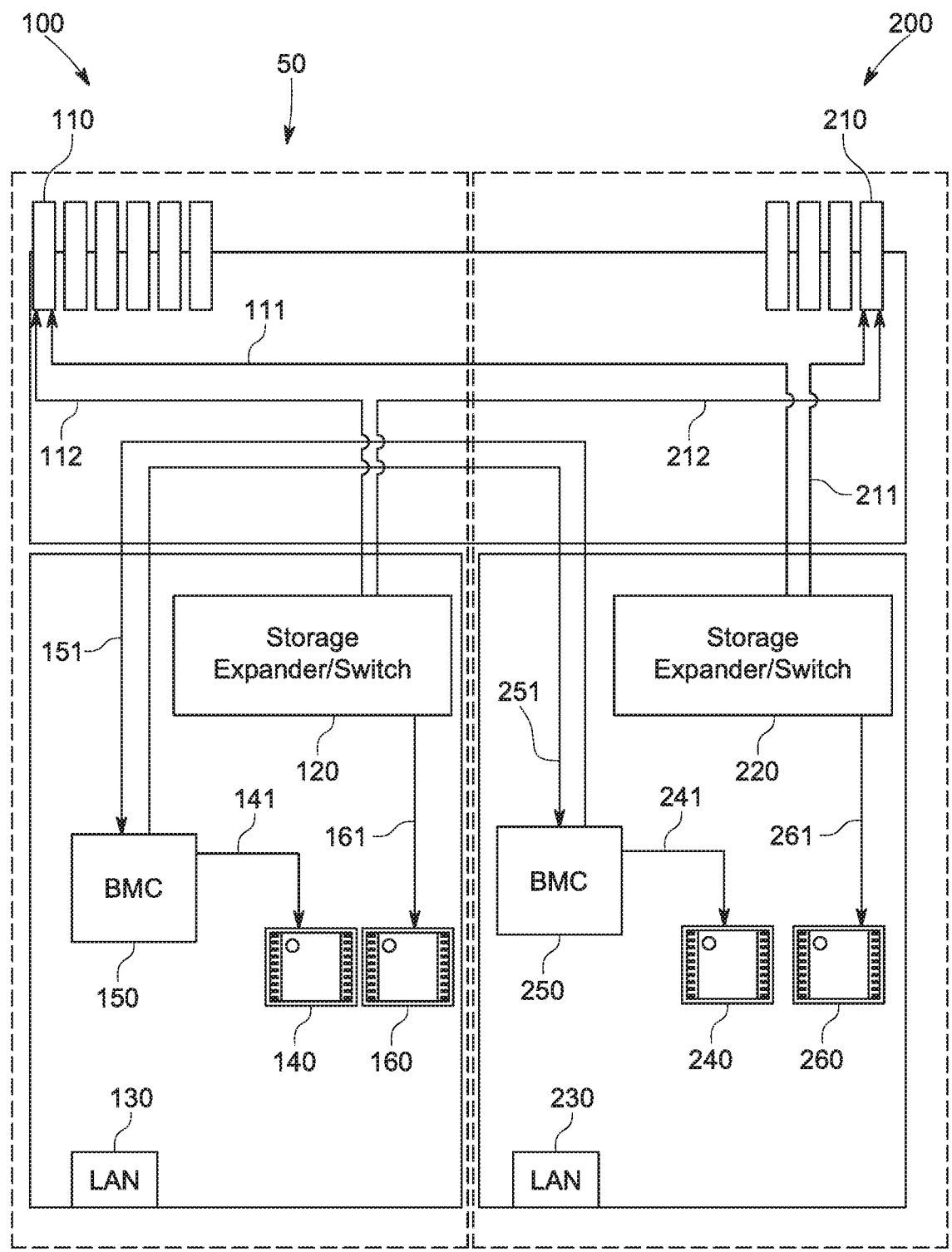
FIG. 1 illustrates a traditional multi-node storage system, as generally known in the prior art.

The present invention is described with reference to the attached figures, where like reference numerals are used throughout the figures to designate similar or equivalent elements. The figures are not drawn to scale, and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

FIG. 1 illustrates a traditional multi-node storage system 50, as known in the prior art. The multi-node storage system 50 can have a first node 100 and a second node 200. The components exemplified in both the first node 100 and the second node 200 are identical. For the purpose avoiding unnecessary replication, the first node 100 is described in full. It should be understood for the purposes of this illustration, that the components of the second node 200 are identical to the first node 100.

The first node 100 can include a plurality of storage devices 110. The plurality of storage devices 110 can include various types of storage device drives. The storage device drives can include, but are not limited to, Hard Disk Drives (HDDs), Solid State Drives (SSDs), and non-volatile memory express (NVMe) devices. The first node 100 also includes a storage expander switch controller 120, a Baseboard Management Controller (BMC) 150, a first flash ROM 140, and a second flash ROM 160. The first flash ROM 140 is connected to the BMC 150, while the second flash ROM 160 is connected to the storage expander switch controller 120. The first flash ROM 140 includes firmware for the BMC 150 while the second flash ROM 160 includes firmware for the storage expander switch controller 120. The first node 100 can also include a Local Area Network (LAN) adapter 130. The first node 100 can be connected to a server system or remote controller by way of the LAN adapter 130.

Similarly, the second node 200 can include a storage expander switch controller 220, a BMC 250, a third flash ROM 240, and a fourth flash ROM 260. The third flash ROM 240 can be connected to the BMC 250 by bus 241, while the fourth flash ROM 260 is connected to the storage expander switch controller 220 by bus 261. The second node 200 can also include a LAN adapter 230, which connects the second node 200 to a server system or remote controller.

As an ordinary person skilled in the art would understand, a NVMe device in the plurality of storage devices 110 can serve as a host controller interface and storage protocol to facilitate the transfer of data between the storage expander switch controller 120 and storage devices such as SSDs, in the plurality of storage devices 110. The storage expander switch controller 120 is a specific type of bus, for example PCIe, SAS or SATA, which allows access to storage devices on the back plane board. The transfer of data can be facilitated between the plurality of storage devices 110 and the storage expander switch controller 120 over a Peripheral Component Interconnect Express (PCIe) bus 112. Similarly, the transfer of data can be facilitated between the plurality of storage devices 110 and the storage expander switch controller 220 (of the second node 200) over a PCIe bus 111. A NVMe device within the plurality of storage devices 210 can be connected to the storage expander switch controller 120 over a PCIe bus 212 and to the storage expander switch controller 220 over a PCIe bus 211. It should also be understood that while a PCIe bus is implemented herein, Serial Advanced Technology Attachment (SATA) and Serial Attached SCSI (SAS) interfaces can be implemented herein as well.

The BMC 150 of the first node 100 is also connected to the BMC 250 of the second node 200 by baseboard buses 151 and 251. Each control node has an independent BMC so they can work independently or together. The BMC 150 is also connected to the first flash ROM 140 by bus 141. The storage expander switch controller 120 is connected to the second flash ROM 160 by bus 161.

The BMC 150 typically includes a code image of firmware located in the first flash ROM 140. The first node 100 can also have a code image of firmware for the storage expander switch controller 120 located in the second flash ROM 160. These images contained in flash have a minimum of two sections of code, a boot block section and an operational code section. The boot block is typically write-protected and is not updated in the field. On the other hand, the operational image can be updated in the field. In existing systems, the BMC firmware image (image stored in the first flash ROM 140) can only be updated if the system has booted to an operating system (OS). When the first node 100 is power cycled, the first action taken by the BMC 150 is to send a message to activate the firmware stored in the flash ROM 140. The firmware then runs a series of tests, called the POST (Power On Self-Test), to verify if the system devices are working correctly. The firmware image stored in the second flash ROM 160 enables the essential functions for the storage expander switch controller 120 to operate. If a firmware image upgrade is corrupted or faulty, the system is unable to boot to the BMC 150 or the storage expander switch controller 120 and is rendered inoperable. The present application teaches a method and system for updating a firmware by the independently operating BMC (e.g., BMC 250 of the second node 200).

Figure 2:
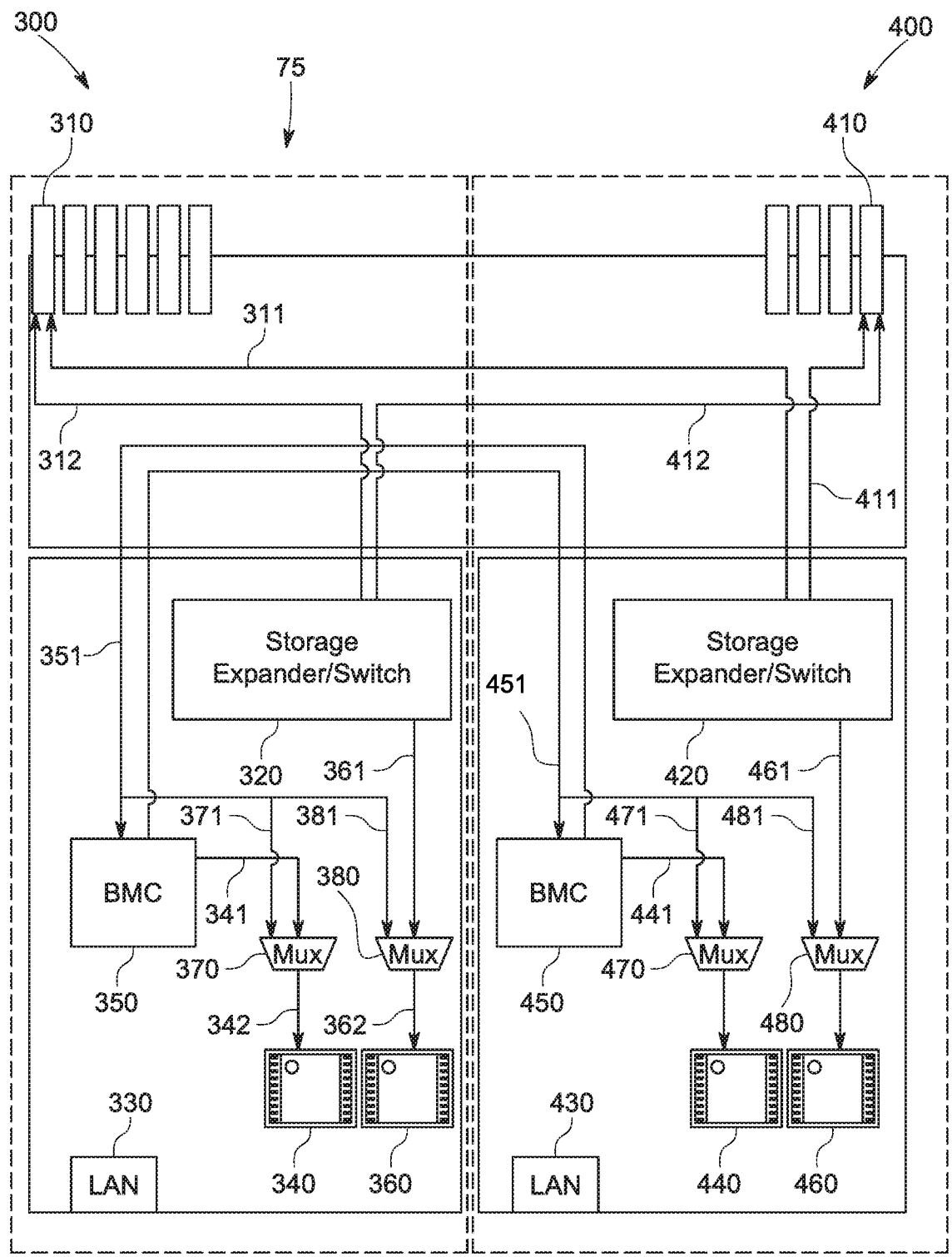
FIG. 2 illustrates an exemplary multi-node storage system, in accordance with an implementation of the disclosure.

FIG. 2 illustrates an exemplary multi-node storage system 75, in accordance with an implementation of the disclosure. The multi-node storage system 75 can include a first node 300 and a second node 400. The components exemplified in both the first node 300 and the second node 400 are identical. For the purpose avoiding unnecessary replication, the first node 300 is described in full. It should be understood for the purposes of this illustration, that the components of the second node 400 are identical to the components of the first node 300. It should be also be understood that while two nodes are shown herein, the multi-node storage system 75 can have hundreds, if not thousands of nodes.

The first node 300 can include a plurality of storage devices 310. The plurality of storage devices 310 can include various types of storage device drives. The storage device drives can include, but are not limited to, Hard Disk Drives (HDDs), Solid State Drive (SSD), or non-volatile memory express (NVMe) devices. The first node 300 can also include a storage expander switch controller 320, a BMC 350, a first flash ROM 340, and a second flash ROM 360. The first flash ROM 340 can be connected to the BMC 350 by way of a first switch device 370. The second flash ROM 360 can be connected to the storage expander switch controller 320 by way of a second switch device 360. This is discussed in greater detail below. The first node 300 can also include a Local Area Network (LAN) adapter 330. The first node 300 can be connected to a server system or remote controller by way of the LAN adapter 330.

Similarly, the second node 400 can include a storage expander switch controller 420, a BMC 450, a third flash ROM 440, and a fourth flash ROM 460. The third flash ROM 440 can be connected to the BMC 450 by bus 441 and a third switch device 470. The fourth flash ROM 460 can be connected to the storage expander switch controller 420 by bus 461 and a fourth switch device 480. The switch devices are discussed in greater detail below with respect to the first node 300. It should be understood that the functionality of the switch devices in both the first node 300 and the second node 400 are similar. The second node 400 can also include a LAN adapter 430, which connects the second node 400 to a server system or remote controller.

As an ordinary person skilled in the art would understand, a NVMe device in the plurality of storage devices 310 can serve as a host controller interface and storage protocol to facilitate the transfer of data between the storage expander switch controller 320 and any SSD drives stored within the plurality of storage devices 310. The transfer of data can be facilitated between the plurality of storage devices 310 and the storage expander switch controller 320 over a PCIe bus 312. Similarly, the transfer of data can be facilitated between the plurality of storage devices 310 and the storage expander switch controller 420 (of the second node 400) over a PCIe bus 312. It should be understood that the NVMe device stored within a plurality of storage devices 410 can be connected to the storage expander switch controller 320 over a PCIe bus 412 and to the storage expander switch controller 420 over a PCIe bus 311. It should also be understood that while a PCIe bus is implemented herein, SATA and SAS interfaces can be implemented herein as well.

The BMC 350 of the first drive 300 is also connected to a BMC 450 of the second drive 400 by baseboard buses 351 and 451. As indicated above, the BMC 350 is also connected to the first flash ROM 340 by way of the first switch device 370. Specifically, the BMC 350 is connected to the first switch device 370 by bus 341. The first switch device 370 can be connected to the first flash ROM 340 by bus 342. The storage expander switch controller 320 is connected to the second flash ROM 360 by way of the second switch device 380. Specifically, the storage expander switch controller 320 is connected to a second switch device 380 by bus 361. The second switch device 380 can be connected to the second flash ROM 360 by bus 362.

Furthermore, the BMC 450 of the second node 400 is also connected to the first flash ROM 340 by way of the first switch device 370. Specifically, the BMC 450 can be connected to first switch device 370 of the first node 300 by bus 351 and bus 371. The first switch device 370 can be connected to the first flash ROM 340. Similarly, the BMC 350 can be connected to the third switch device 470 of the second node 400 by bus 451 and bus 471. The BMC 450 of the second node 400 is connected to the second flash ROM 360 by way of the second switch device 380. Specifically, the BMC 450 can be connected to the second switch device 380 of the first node 300 by bus 351 and bus 381. The second switch device 380 can be connected to the second flash ROM 360 by bus 362. Similarly, the BMC 350 can be connected to the fourth switch device 480 of the second node 400 by bus 451 and bus 481.

The switch devices 370 and 380 can be configured as SPI multiplexor (MUX) devices. In some exemplary embodiments, the first switch device 370 can multiplex two SPI (Serial Peripheral Interface) master devices, the BMC 350, and the BMC 450 to a single slave device such as the first flash ROM 340. The BMC 350 can control the master devices selection of the first switch device 370 by an output pin extending from the BMC 350 to the first switch device 370. Similarly, the second switch device 380 can multiplex two SPI master devices, the storage expander switch controller 320, and the BMC 450 to a single slave device such as the second flash ROM 360. The BMC 450 can control the master devices selection by an output pin extending from the BMC 450 to the second switch device 380, via the bus 381 and the baseboard bus 351.

Typically, the BMC 350 has a firmware code image located in the first flash ROM 340. The first node 300 can also have a firmware code image for the storage expander switch controller 320 located in the second flash ROM 360. These images contained in flash have a minimum of two sections of code—a boot block section and an operational code section. The boot block is typically write-protected and is not updated in the field. Conversely, the operational image can be updated in the field.

In the exemplary multi-node storage system 75, even if the system has not booted to an OS, a first firmware image saved in the first flash ROM 340 can be updated. If the firmware image upgrade is corrupted or faulty, the system is still able to boot to the operating system using the BMC 450 of the separate-independent node. The flash image is recovered from a third flash ROM 440 to the first flash ROM 340, then the BMC 350 boots from the first flash ROM 340 after resetting the first node 300. For example, when the first node 300 is power cycled, the first action the BMC 350 takes is to send a message to activate the firmware image stored in both flash ROM 340 and flash ROM 360. The firmware then runs a series of tests, called the POST (Power On Self-Test), to verify if the system devices are working correctly. Where the firmware image stored in the first flash ROM 340 is corrupted, the BMC 350 can retrieve a firmware image stored in the third flash ROM 440 of the second node 400. The firmware image stored within the third flash ROM 440 of the second node 400 is copied to the first flash ROM 340 and can be used to boot the BMC 350 of the first node 300. Correspondingly, if the firmware for the second flash ROM 360 for the storage expander switch controller 320 is corrupted, the BMC 350 can access a copy of the firmware in a fourth flash ROM 460 and copy it to the second flash ROM 360 to start the storage expander switch controller 320.

Figure 3:
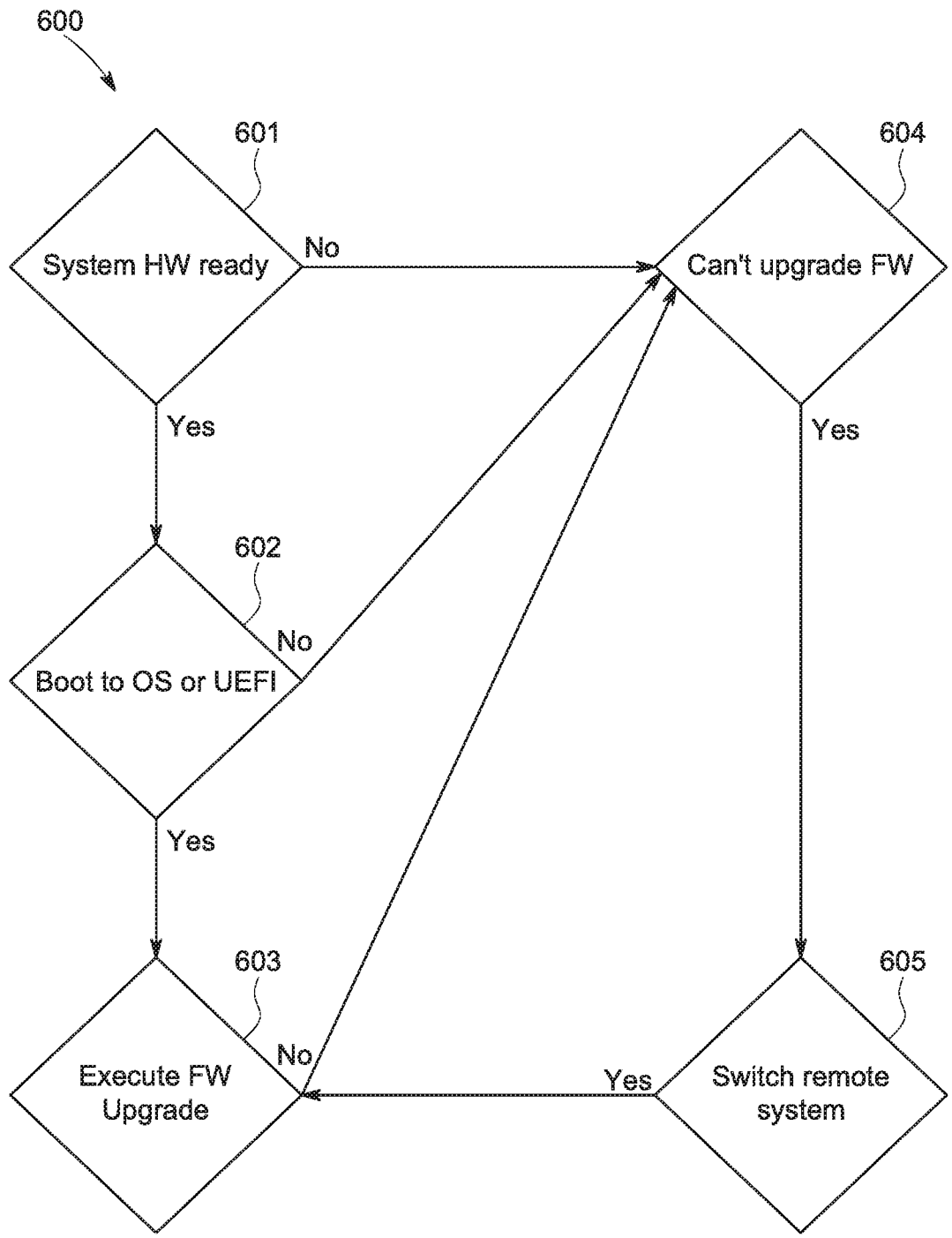
FIG. 3 depicts an exemplary flow chart describing a process for updating and writing a firmware image, in accordance with an implementation of the disclosure.

FIG. 3 depicts an exemplary flow chart describing a process 600 for updating and writing the firmware image for the BMC of a node, in accordance with an implementation of the disclosure.

The process 600 indicated herein is described in detail with reference to the components of the multi-node storage system 75 of FIG. 2. The process 600 will detail the procedure of updating the firmware within the first node 300 of the multi-node storage system 75 using the second node 400. As an initial matter, a determination is made at 601 whether the hardware components within the first node 300 are online and ready for a firmware update. If it is determined that the hardware components within the first node 300 are online and ready for a firmware update, the process advances to step 602. At step 602, the multi-node storage system 75 attempts to boot to OS. If the boot is successful, the process 600 advances to step 603 where the firmware upgrade is executed. In the event the hardware components are not online or ready for a firmware update at step 601, the process 600 advances to step 604. Similarly, in the event the multi-node storage system 75 is unable to boot to OS at step 602, the process 600 advances to step 604. Finally, in the event none of the conditions are met at steps 601, 602, or 603, the process 600 advances to step 604, where the firmware upgrade is not executed. At this point, the process 600 advances to step 605 where the multi-node storage system 75 switches to a remote system. In this case, the remote system is the second node 400.

Specifically, a user firmware volume can be stored on one or more memory devices, such as the first flash ROM 340 for the BMC 350 or the second flash ROM 360 for the storage expander switch controller 320. It should be understood that the user firmware volume can be stored on any flash memory storage component of the multi-node storage system 75. The BMC 350 can obtain a firmware file for updating the controller firmware used by the first node 300 during the boot process. Specifically, the BMC 350 can generate or compile the firmware file and store it in memory, such as ROM, for deployment or integration into the controller firmware of the first node 300. However, in the event the firmware update process is interrupted, or otherwise unable to complete, the BMC 350 can retrieve a firmware image stored in a third flash ROM 440 of the second node 400. The firmware image stored within the third flash ROM 440 of the second node 400 can be copied to the first flash ROM 340. The copied firmware then may be used to boot to the operating system of the first node 300. It should be understood that the same process can be implemented on the fourth flash ROM 460.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The terminology used herein is for the purpose of describing particular embodiments only and is not intended to limit the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A multi-node storage system comprising:
    a first node comprising:
        a first baseboard management controller (BMC);
        a first flash ROM configured to store a first flash image; and
        a first switch device configured to connect the first BMC to the first flash ROM; and
    a second node comprising:
        a second BMC connected to the first switch device;
        a second flash ROM configured to store a second flash image; and
        a second switch device configured to connect the second BMC to the second flash ROM, wherein the first BMC is connected to the second switch device, wherein the second flash image is the same as the first flash image and wherein the first BMC accesses the flash image on the second flash ROM to copy the flash image on the second flash ROM to the first flash ROM to operate the first node when the first flash image is corrupted.

2. The multi-node storage system of claim 1, wherein the first node further comprises a first storage controller, a third flash ROM configured to store a third flash image, and a third switch device configured to connect either the first BMC or the second BMC to the third flash ROM, and
wherein the second node further comprises a second storage controller, a fourth flash ROM configured to store a fourth flash image, fourth flash image identical to the third flash image, and a fourth switch configured to connect either the first BMC or the second BMC to the fourth flash ROM.

3. The multi-node storage system of claim 1, wherein the first node further comprises a first plurality of storage devices connected to the first storage expander switch controller and the second storage expander switch controller.

4. The multi-node storage system of claim 3, wherein the first plurality of storage devices comprises at least one of a hard disk drive (HDD), a solid state drive (SSD), or a non-volatile memory express (NVMe).

5. The multi-node storage system of claim 4, wherein the NVMe is configured to serve as a host controller interface and storage protocol to facilitate transfer of data between the first storage switch expander controller and the SSD drive.

6. The multi-node storage system of claim 1, wherein the second node further comprises a second plurality of storage devices connected to the first storage expander switch controller and the second storage expander switch controller.

7. The multi-node storage system of claim 6, wherein the second plurality of storage devices comprises at least one of a hard disk drive (HDD), a solid state drive (SSD), or a non-volatile memory express (NVMe).

8. The multi-node storage system of claim 7, wherein the NVMe is configured to serve as a host controller interface and storage protocol to facilitate transfer of data between the second storage switch expander controller and the SSD drive.

9. The multi-node storage system of claim 1, wherein the first flash image comprises a first BMC firmware flash image and the second flash image comprises a first storage switch expander controller firmware flash image.

10. The multi-node storage system of claim 2, wherein the third flash image comprises a second BMC firmware flash image and the fourth flash image comprises a second storage switch expander controller firmware flash image.

11. The multi-node storage system of claim 2, wherein each of the first switch device, the second switch device, the third switch device, and the fourth switch device comprises a multiplexor (MUX).

12. The multi-node storage system of claim 10, wherein each of the first switch device, the second switch device, the third switch device, and the fourth switch device is configured to multiplex the first BMC and the second BMC.

13. The multi-node storage system of claim 11, wherein the first BMC is configured to retrieve the third flash image stored in the third flash ROM, or the fourth flash image in the fourth flash ROM.

14. The multi-node storage system of claim 11, wherein the second BMC is configured to retrieve the first flash image stored in the first flash ROM, or the second flash image stored in the second flash ROM.

15. A method of updating a firmware in a multi storage node system, the method comprising:
power cycling a first node, the first node comprising: a first baseboard management controller (BMC), a first flash ROM configured to store a first flash image, and a first switch device configured to connect the first BMC to the first flash ROM;
activating the first flash image in the first flash ROM;
determining at least one of the following: at least one hardware component within the first node is not online or ready for a firmware update, the first flash image is corrupted, and/or the first node is unable to boot to OS; and
retrieving, by the first BMC, a second flash image stored in a second flash ROM stored on a second node, wherein the first BMC is connected to a second switch device in the second node, wherein the second flash image is the same as the first flash and wherein the first BMC accesses the flash image on the second flash ROM to copy the flash image on the second flash ROM to the first flash ROM to operate the first node.

16. The method of claim 15, wherein the first node further comprises a first storage controller, a third flash ROM configured to store a third flash image, and a third switch device configured to connect either the first BMC or the second BMC to the third flash ROM, and
wherein the second node further comprises a second storage controller, a fourth flash ROM configured to store a fourth flash image, fourth flash image identical to the third flash image, and a fourth switch configured to connect either the first BMC or the second BMC to the fourth flash ROM.

17. The method of claim 16, wherein the first flash image comprises a first BMC firmware flash image and the second flash image comprises a first storage switch expander controller firmware flash image.

18. The method of claim 16, wherein the third flash image comprises a second BMC firmware flash image and the fourth flash image comprises a second storage switch expander controller firmware flash image.

19. The method of claim 16, wherein each of the first switch device, the second switch device, the third switch device, and the fourth switch device comprises a multiplexor (MUX).

20. The method of claim 19, wherein each of the first switch device, the second switch device, the third switch device, and the fourth switch device is configured to multiplex the first BMC and the second BMC.

* * * * *